United States Patent [19]
Muljono et al.

[11] Patent Number: 6,044,417
[45] Date of Patent: Mar. 28, 2000

[54] SYSTEM FOR CONTROLLING OPERATIONAL CHARACTERISTICS OF BUFFER GROUP WHERE CAPTURE REGISTERS RECEIVE CONTROL SIGNALS IN PARALLEL AND UPDATE REGISTERS TRANSFER CONTROL SIGNALS TO BUFFER GROUP

[75] Inventors: Harry Muljono, Union City; Stefan Rusu, Sunnyvale, both of Calif.

[73] Assignee: Intel Corporation, Santa Clara, Calif.

[21] Appl. No.: 09/002,140

[22] Filed: Dec. 31, 1997

[51] Int. Cl.[7] .................................... G06F 13/10
[52] U.S. Cl. ........................... 710/52; 326/21; 326/37; 326/38; 326/39; 382/308; 710/129; 710/130
[58] Field of Search ................... 307/468; 326/38, 326/40; 382/303; 710/52, 129, 130

[56] References Cited

U.S. PATENT DOCUMENTS

| | | | |
|---|---|---|---|
| 4,612,459 | 9/1986 | Pollachek | 307/468 |
| 4,685,144 | 8/1987 | McCubbrey et al. | 382/303 |
| 5,634,043 | 5/1997 | Self et al. | 395/558 |
| 5,736,867 | 4/1998 | Keiser et al. | 326/38 |
| 5,804,987 | 9/1998 | Ogawa et al. | 326/40 |
| 5,869,979 | 2/1999 | Bocchino | 326/38 |

OTHER PUBLICATIONS

BUS Topology Documents, Frank M. Lin; http://www.sb-pa.csusb.edu/~flinm/info609/network/telnet16—19.html (Dec. 15, 1997) 4 pages.

*Primary Examiner*—Thomas C. Lee
*Assistant Examiner*—Chien Yuan
*Attorney, Agent, or Firm*—Blakely, Sokoloff, Taylor & Zafman LLP

[57] ABSTRACT

In one aspect of the present invention, a bus buffer is provided. The bus buffer includes at least one buffer group having first and second groups of control input terminals. The first and second groups of control input terminals control different operational characteristics of the buffer group. The bus buffer includes first and second capture registers and first and second update registers. The data output terminals of the first update register are connected to the first group of control input terminals. The data output terminals of the second update register are coupled to the second group of control input terminals. The data input terminals of the first and second update registers are coupled to the data output terminals of the first and second capture registers, respectively. The bus buffer includes a new settings register having data output terminals coupled to the data input terminals of the capture registers.

29 Claims, 9 Drawing Sheets

SYSTEM FOR CONTROLLING OPERATIONAL CHARACTERISTICS OF BUFFER GROUP WHERE CAPTURE REGISTERS RECEIVE CONTROL SIGNALS IN PARALLEL AND UPDATE REGISTERS TRANSFER CONTROL SIGNALS TO BUFFER GROUP

BACKGROUND OF THE INVENTION

1. Field of the Invention

This invention relates generally to processors and buses, and more particularly, to a method and apparatus for controlling the operational characteristics of individual bus buffer groups.

2. Description of the Related Art

Referring to FIG. 1, a bus 10 transports logical signals between devices of a computer that include a processor 12, a memory 14, and an input/output device 16. The processor 12 couples to the bus lines 18 by means of one or more bus buffers 20. By adjusting the operational characteristics of the bus buffer 20, the interaction between the processor 12 and the bus 10 can be optimized. The operational characteristics include slew rate, output impedance, and input impedance. The operational characteristics of the bus buffer 20 to a large extent determine the quality and timing of signal transmission and reception to and from the device that connects to the bus 10 through the bus buffer 20, i.e., the processor 12.

In high speed computers, one important goal is to tune the operational characteristics of the bus buffer 20 so that the performance of the bus 10 is optimized. The optimal settings for the operational characteristics of the bus buffer 20 depend on external properties such as bus topology, bus loading, and signal quality requirements. Improperly matching the operational characteristics of the bus buffer 20 to these external properties can result in undesirable signal reflections, power wastage, signal overshoots, and signal undershoots. Bus performance can be maintained by changing the operational characteristics of the bus buffer 20 to match both the properties of the lines 18 and the properties of the other devices 14, 16, 22 attached to the bus 10.

Subsequent modifications of the bus topology and loading can necessitate changing the operational characteristics of the bus buffer 20. For example, adding a device 22 to the bus modifies the bus topology and not changing the impedance of the bus buffer 20 to match the modification may result in undesirable signal reflections. If the modifications occur at the manufacturing level, changing the operational characteristics to match the modifications can demand the lengthy and costly process of constructing and testing new prototypes for the bus buffer 20. If the modifications are made by an end user, e.g., adding the device 22 to the bus 10, it may not be possible to change the operational characteristics of the bus buffer 20 to maintain performance levels. Since later modifications to bus topology and loading are common, the need to be able subsequently change the operational characteristics of the bus buffer 20 is endemic.

In prior art devices, processor control has been used to maintain bus performance in situations where user modifications or modifications during operation are possible. Bus controllers of the prior art have, however, certain deficiencies. First, a bus buffer 20 includes several groups that connect to separate bus lines. A bus may include groups for address signals, data signals, clock signals and control signals. In many situations, the topology and/or loading of the separate bus groups is different or may evolve differently during operation. In such cases, optimal performance cannot be achieved by changing the operational characteristics of all bus groups together. Second, optimizing performance ordinarily demands that the operational characteristics of the bus buffer 20, i.e., slew rate, output impedance, and input impedance be separately adjustable. Third, prior art methods do not introduce sufficient flexibility into the operational characteristics of bus buffers to ensure that performance can be maintained following modifications by end users through software programs and/or a basic input/output system (BIOS). As processors operate at higher frequencies and incorporate more complicated I/O topologies, problems of reflections, overshoots, undershoots, and wasted power, may be insufficiently addressed by the prior art methods for adjusting the operational characteristics of the bus buffer 20.

The present invention is directed to overcoming, or at least reducing the effects of, one or more of the problems set forth above.

SUMMARY OF THE INVENTION

In one aspect of the present invention, a bus buffer is provided. The bus buffer includes at least one buffer group having first and second groups of control input terminals. The first and second groups of control input terminals control different operational characteristics of the buffer group. The bus buffer includes first and second capture registers and first and second update registers. The data output terminals of the first update register are connected to the first group of control input terminals. The data output terminals of the second update register are coupled to the second group of control input terminals. The data input terminals of the first and second update registers are coupled to the data output terminals of the first and second capture registers, respectively. The bus buffer includes a new settings register having data output terminals coupled to the data input terminals of the capture registers.

BRIEF DESCRIPTION OF THE DRAWINGS

Other objects and advantages of the invention will become apparent upon reading the following detailed description and upon reference to the drawings in which.

Figure 1:
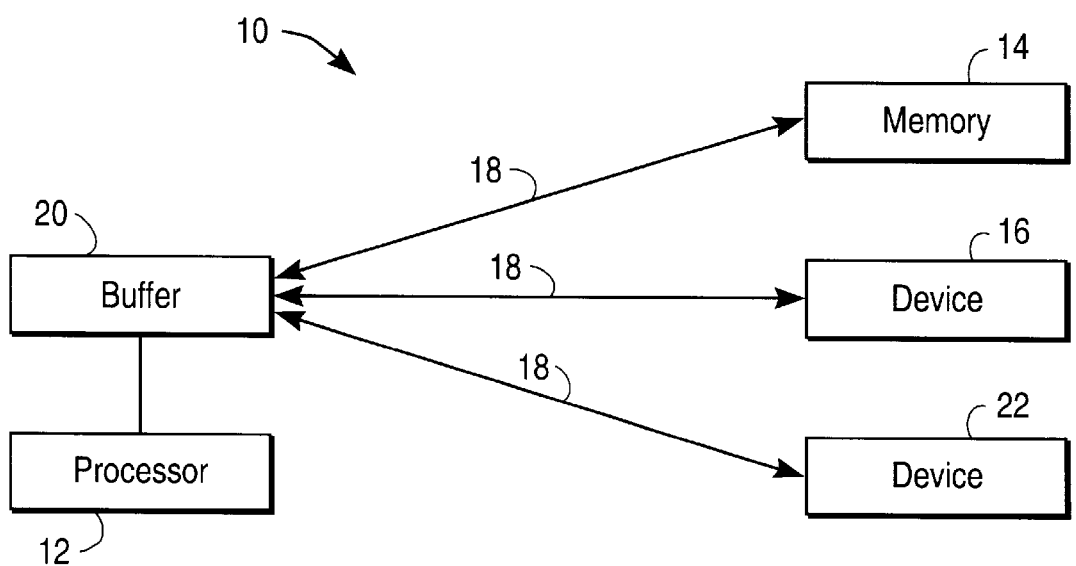
FIG. 1 illustrates a star-topology bus of the prior art.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The illustrative embodiments enable changing the operational characteristics of separate groups of a bus buffer individually. The bus buffer groups include data groups, address groups, clock groups, and control groups. Some embodiments enable changing the operational characteristics of specialized buses which may include other types of buffer groups. The operational characteristics that can be changed include slew rate, output impedance and input impedance of the various bus buffer groups. The controllable bus buffer may connect a processor or another device to the bus lines. Finally, the bus may be a bus for connecting devices internal to a computer or a bus for connecting input/output (I/O) devices to the computer.

1. Device to Change Operational Characteristics

Figure 2:
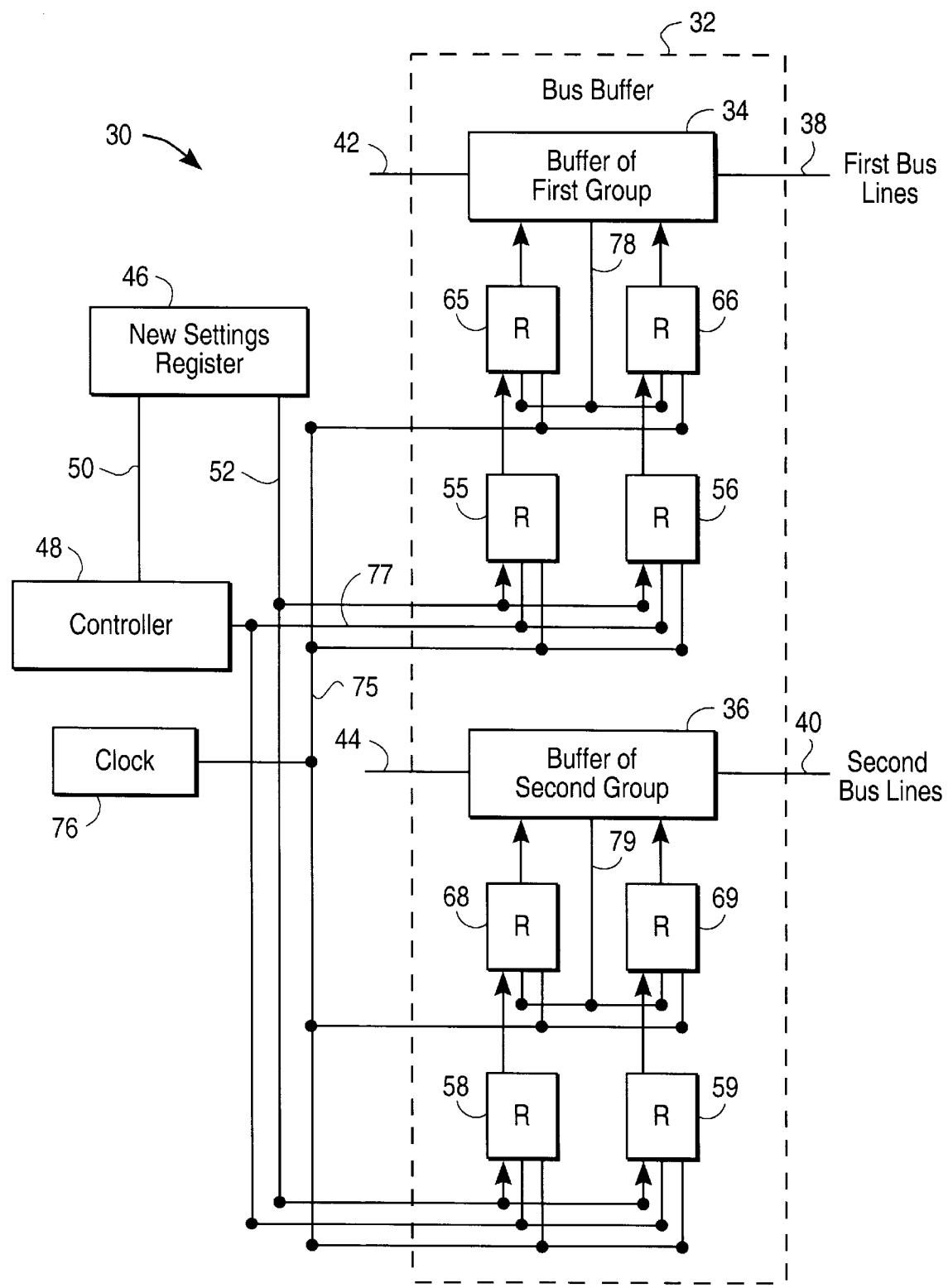
FIG. 2 illustrates one embodiment for an apparatus to control the operational characteristics of a bus buffer.

FIG. 2 illustrates a first embodiment of a device 30 for changing the operational characteristics of a bus buffer 32. The bus buffer 32 includes first and second buffer groups 34, 36 that connect to separate bus lines 38, 40 and to separate input/output lines 42, 44 of a device, e.g., a processor (not shown). The first and second buffer groups 34, 36 are buffers for separate bus groups, e.g., data and address groups. A new settings register 46 stores signals for new settings of the operational characteristics of the bus buffer 32. In some embodiments, the new settings register 46 includes a plurality of locations for storing different settings for the operational characteristics of the bus buffer 32. A controller 48 has lines 50 that control the transmission of the signals for the new settings register 46. In some embodiments, the controller 48 is a programmable logic device.

The data output terminals of the new settings register 46 attach to the lines 52 that connect to data input terminals of individual capture registers 55, 56, 58, 59 associated with each buffer group 34, 36. Each of the individual data lines 52 connects to an individual data input terminal of each capture register 55, 56, 58, 59. Each data output terminal of the capture register 55, 56, 58, 59 connects individually to one data input terminal of the corresponding update register 65, 66, 68, 69. In specific embodiments, the registers 55, 56, 58, 59, 65, 66, 68, 69, may be parallel loading registers made of flip-flops or of D latches. The output terminals of the update registers 65, 66, 68, 69 connect to control terminals of the first and second buffer groups 34, 36 of the bus buffer 32. The registers 55, 56, 58, 59, 65, 66, 68, 69 form double layers for receiving data for new settings of the operational characteristics for each buffer group 34, 36 of the bus buffer 32. A line 75 connects a clock 76 to each of the registers 55–56, 58–59, 65–66, 68–69 so that all the bits of the data from the new settings register 46 are passed to the capture registers 55–56, 58–59 and to the control inputs of the separate buffer groups 34, 36 substantially simultaneously. The controller 48 has second output lines 77 for enabling selected capture registers 55–56, 58–59 individually. Lines 78, 79 from the first and second buffer groups 34, 36 enable the update registers 65–66, 68–69 to transmit stored settings to hardware structures (not shown) internal to the buffer groups 34, 36. The hardware structures implement changes to the operational characteristics. The update registers 65–66, 68–69 transmit stored binary signals for settings, whenever the corresponding bus buffer groups 34, 36 are not receiving or sending data from or to the corresponding bus lines 38, 40 or from or to the lines 42, 44 form the device (not shown) connected to the bus lines 38, 40 via the bus buffer 32.

Control logic (not shown) internal to each buffer group 34, 36 resets the operational characteristics of the buffer group 34, 36 in response to receiving the new settings of the operational characteristics from the corresponding update registers 65, 66, 68, 69. Each individual capture register 55, 56, 58, 59 corresponds to one operational characteristic; e.g., slew rate and output impedance; for one of the buffer groups 34, 36. The new-settings register sends an S-bit word on the lines 52 that allows fixing the setting of each operational characteristic to one of $2^S$ values. The control lines 77 enable one of the capture registers 55, 56, 58, 59 at a time. Thus, only one operational characteristic of one of the buffer groups 34, 36 of the bus buffer 32 is captured in each transmission cycle. In one embodiment, the number of control lines 77 is equal to the number of bus groups times the number of operational characteristics controlled, i.e., the number of capture registers 55, 56, 58, 59 or a total of four lines 77 in the embodiment 30 illustrated in FIG. 2. Thus, the control lines 77 carry signals for the address information of the capture registers 55, 56, 58, 59, i.e. the address information includes the bus group 34, 36 and the type of operational characteristic setting captured by the particular capture register 55, 56, 58, 59.

Figure 3:
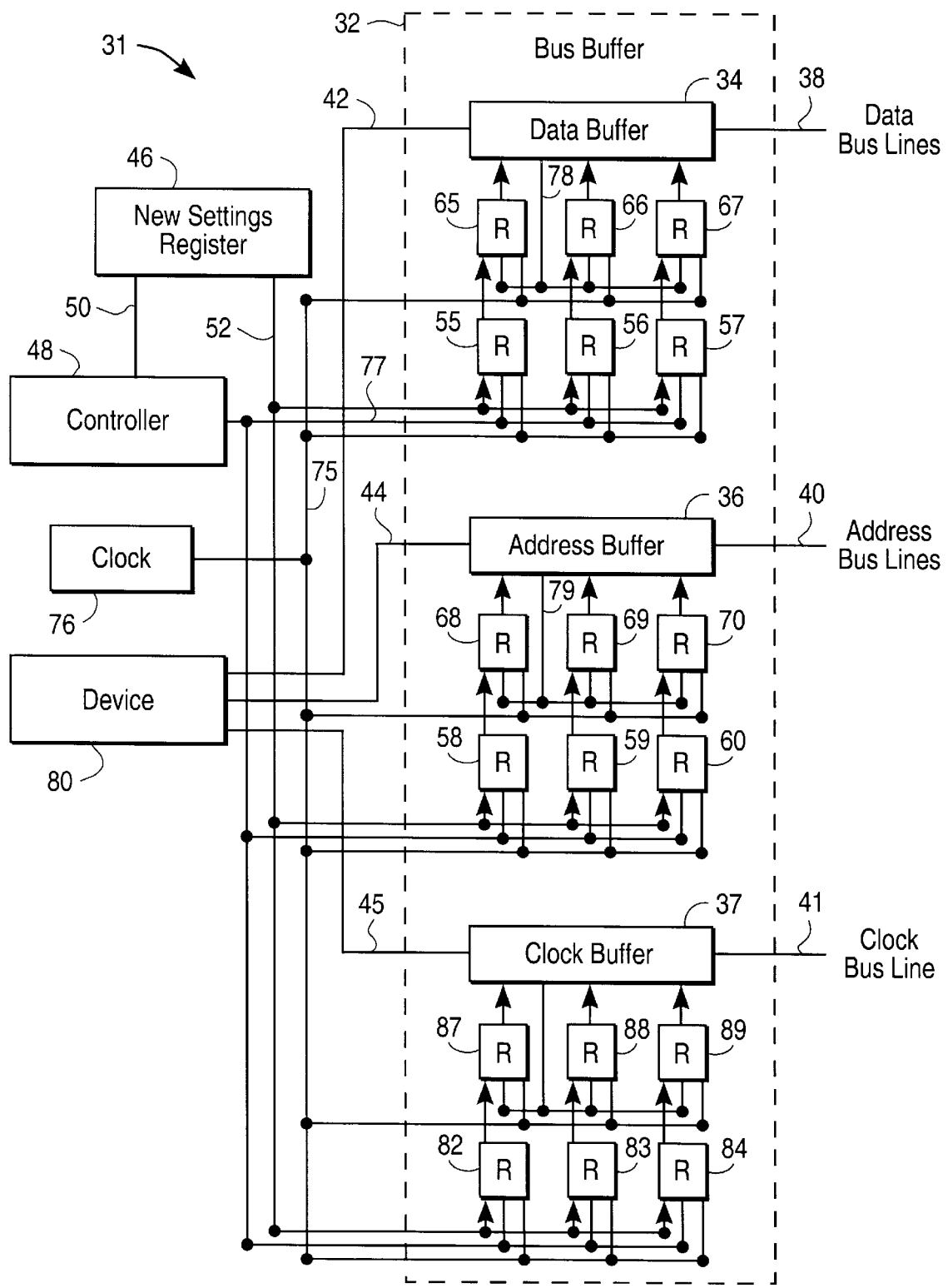
FIG. 3 illustrates a specific embodiment of a controller for the slew rate, output impedance, and input impedance of address, data and clock groups of a bus buffer.

FIG. 3 illustrates a specific embodiment 31 of the bus buffer 32 in which three buffer groups are tunable for three separate operational characteristics. The three groups transmit and receive data, address, and clock information between bus lines 38, 40, 41 and corresponding lines 42, 44, 45 that couple a device 80 to the bus buffer 32. For each group, a corresponding group buffer 34, 36, 37 has capture and update registers 55, 58, 82, 65, 68, 87 for signals for new settings of the slew rate, capture and update registers 56, 59, 83, 66, 69, 88 for signals for new settings of the output impedance, and capture and update registers 57, 60, 84, 67, 70, 89 for signals for new settings of the input impedance. The new settings register 46 transmits the data to override present settings for the three operational characteristics through the lines 52. The controller 48 sends control logic signals to the new settings register 46 through the lines 50 and sends enabling signals individually to one of the capture registers 55–57, 58–60, 82–84 at a time via the lines 77.

In some embodiments, new settings register 46 and/or controller 48 of FIGS. 2 and 3 are programmable to separately change the slew rate, output impedance, and input impedance of the data, address, and/or clock buffer 34, 36, 37 during operation of the processor (not shown). For example, the basic input/output system (BIOS) program may program the new settings register 46 to set default settings of the operational characteristics of the individual group buffers 34, 36, 37 during the startup or system boot routine for a processor. In some embodiments, the user may program the new settings register 46, using a software program, to override the default settings of the operational characteristics with different settings while running user controlled programs. A programmable new settings register 46 may also be used to determine optimal settings for the operational characteristics during tests, during operation, and after redesigns of devices connected to the bus. Finally, since the controller 48 can separately change the operational characteristics of individual buffer groups or group buffers 34, 36, and 37 the devices 30, 31 of FIGS. 2 and 3 can compensate for different topologies or loadings on the bus lines 38, 40, 41 of different groups.

Figure 4:
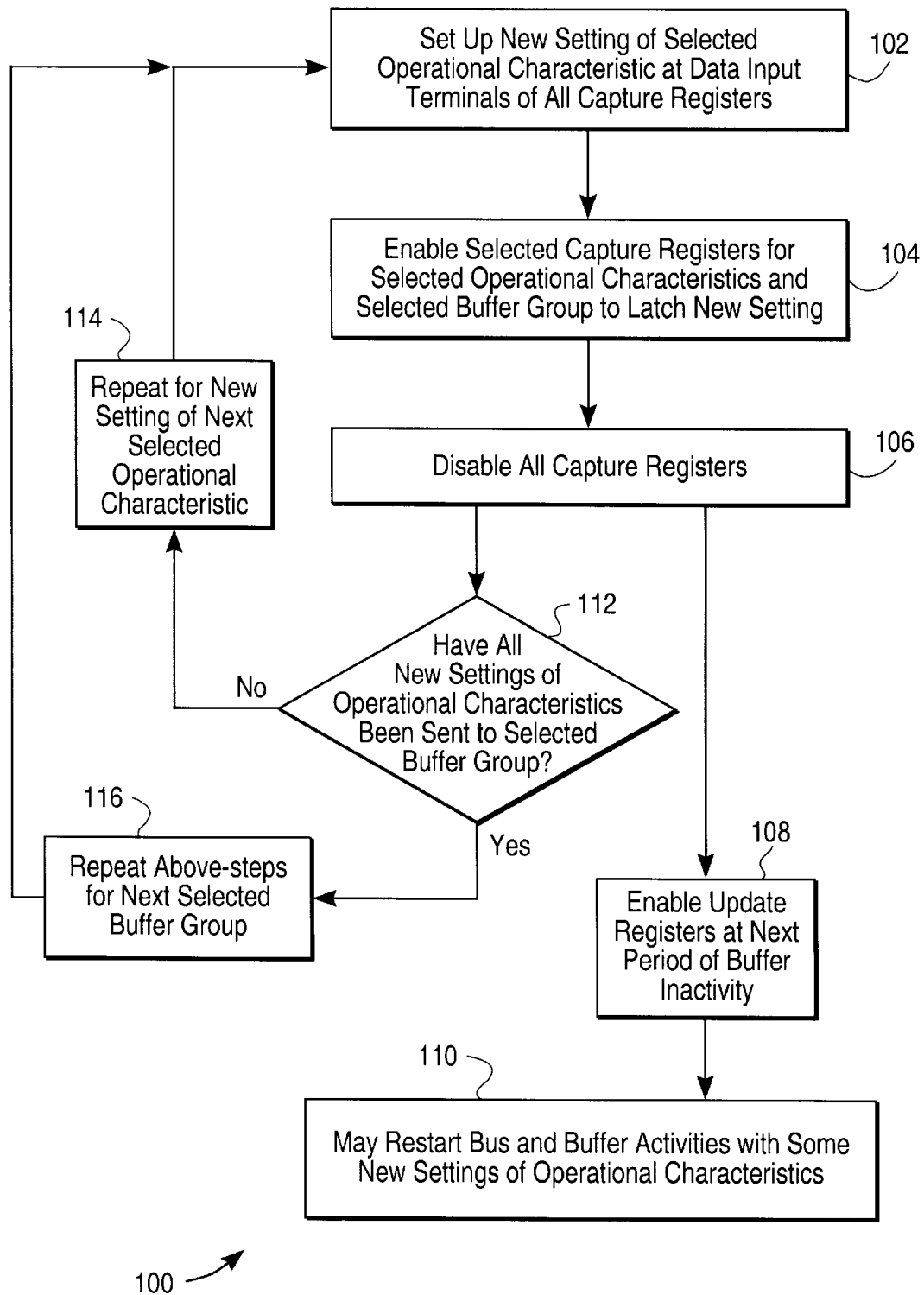
FIG. 4 is a flowchart illustrating a method for controlling and changing the operational characteristics of separate groups of a bus buffer.

FIG. 4 is a flowchart illustrating a method 100 for changing the settings of operational characteristics of the bus buffer 32 of FIG. 2. At block 102, the new settings register 46 sets up a constant signal for a new setting of a selected operational characteristic. The lines 52 deliver the logic bits of the signal for the setting to the input terminals of all of the capture registers 55, 56, 58, 59 of both buffer groups 34, 36 in parallel and substantially simultaneously. At block 104, the controller 48 sends a signal to enable the capture register 55, 56, 58, 59 for the selected operational characteristic of the selected buffer group 34, 36 to latch the data signal for the new setting. At the next clock pulse on the line 75, the selected capture register 55, 56, 58, 59 of the selected buffer group 34, 36 latches the signal for the new setting of the operational characteristic. At block 106, the controller 48 stops sending the enable signal to the selected capture register 55, 56, 58, 59. Thereafter, changes in the data signal from the new settings register 46 do not affect the operational characteristics of the first and second buffer groups 34, 36.

At block 108, the update registers 65, 66, 68, 69 send signals for present settings of the operational characteristics to the corresponding buffer group 34, 36 during the next period in which the corresponding buffer group 34, 36 is inactive, i.e., when the buffer group 34, 36 is not sending or receiving logical data to or from the bus lines 38, 40 or to or from the internal lines 42, 44. By enabling the update registers 65, 66, 68, 69 during periods of inactivity, the updates of the operational characteristics do not interfere with data transmission or receipt. At block 108, the update registers 65, 66, 68, 69 having new settings for the operational characteristics transmit the new settings to the corresponding buffer group 34, 36, and the update registers 65, 66, 68, 69 having old settings of the operational characteristics transmit the old settings to the corresponding buffer group 34, 36 again. At block 110, the bus buffer 32 may restart activity with new settings for some of the operational characteristics.

At block 112, the controller 48 determines whether all the new settings of the operational characteristics have been sent to the selected buffer group 34, 36 of the bus buffer 32. At block 114, the above-described steps are repeated to send a new setting of the next selected operational characteristic of the same selected buffer group 34, 36. Steps 102, 104, and 106 are repeated using signals for the next new setting of another operational characteristic of the selected buffer group 34, 36. Now, at block 104, the enable signal from the controller 48 enables the capture register 55, 56 to capture the new setting of the second selected operational characteristic. At block 112, the controller 48 determines again whether all the new settings of the operational characteristics have been sent to the first selected buffer group 34, 36 of the bus buffer 32. At block 116, the above-described steps are repeated to send new settings of the operational characteristics of the next selected buffer group 34, 36 if all of the selected capture registers 55, 56 of the first selected buffer group 34, 36 have received the selected new settings. Steps 102, 104, 106, and 114 are repeated using settings and enable signals for the selected operational characteristics and capture registers 55, 56, 58, 59, 65, 66, 68, 69 of the second selected buffer group 34, 36. Thus, the controller 48 sequentially changes each operational characteristic of each buffer group 34, 36 until all of the selected operational characteristics have the selected new settings.

2. Device to Change Operational Characteristics Having Shared Data and Address Lines The embodiments of FIGS. 2 and 3 use separate lines 77 and 52 to enable a selected capture register 55, 56, 58, 59 and to transmit the new setting of the selected operational characteristic. The number of separate lines 77, 52 for the address signals and for the setting signals can be equal (number of buffer groups)×(types of operational characteristics)+(number of setting bits per operational characteristic). The address signals are defined herein to include both the buffer group and the type of operational characteristic. A second embodiment employs fewer lines than the embodiments of FIGS. 2 and 3 by employing a pipeline-like structure to transmit both data signals and the address signals.

The second embodiment also employs one line to transmit an "address select signal." If the address select signal has the value logic 1, the capture registers are enabled to process an address signal. If the address select signal has the value logic 0, a new setting of an operational characteristic is being sent. An embodiment having two buffer groups; two operational characteristics; e.g., slew rate and output impedance; and $2^3$ settings for each operational characteristic can be constructed by using only four lines to transmit signals to the capture registers. Additional logic hardware is also used to process address signals. Table 1 illustrates the various signals for this embodiment.

TABLE 1

| Digital signal | Type of Signal |
| --- | --- |
| 1001 | Address signal to change the slew rate of both buffer groups |
| 1000 | Address signal to change the input impedance of both buffer groups |
| 1011 | Address signal to change the slew rate of first buffer group |
| 1010 | Address signal to change the input impedance of first buffer group |
| 1101 | Address signal to change the slew rate of second buffer group |
| 1100 | Address signal to change the input impedance of second buffer group |
| 0xyz | Signal for setting xyz for the operational characteristic; x,y,z = 0,1 |

The address signals transmit data on the last three lines, i.e., one bit each, and the logic 1 address select signal on the first line, i.e., one bit. Signals for a new setting of an operational characteristic transmit the identity of one of the $2^3$ potential settings on the last three lines and the logic 0 signal corresponding to a no address select signal on the first line.

Figure 5:
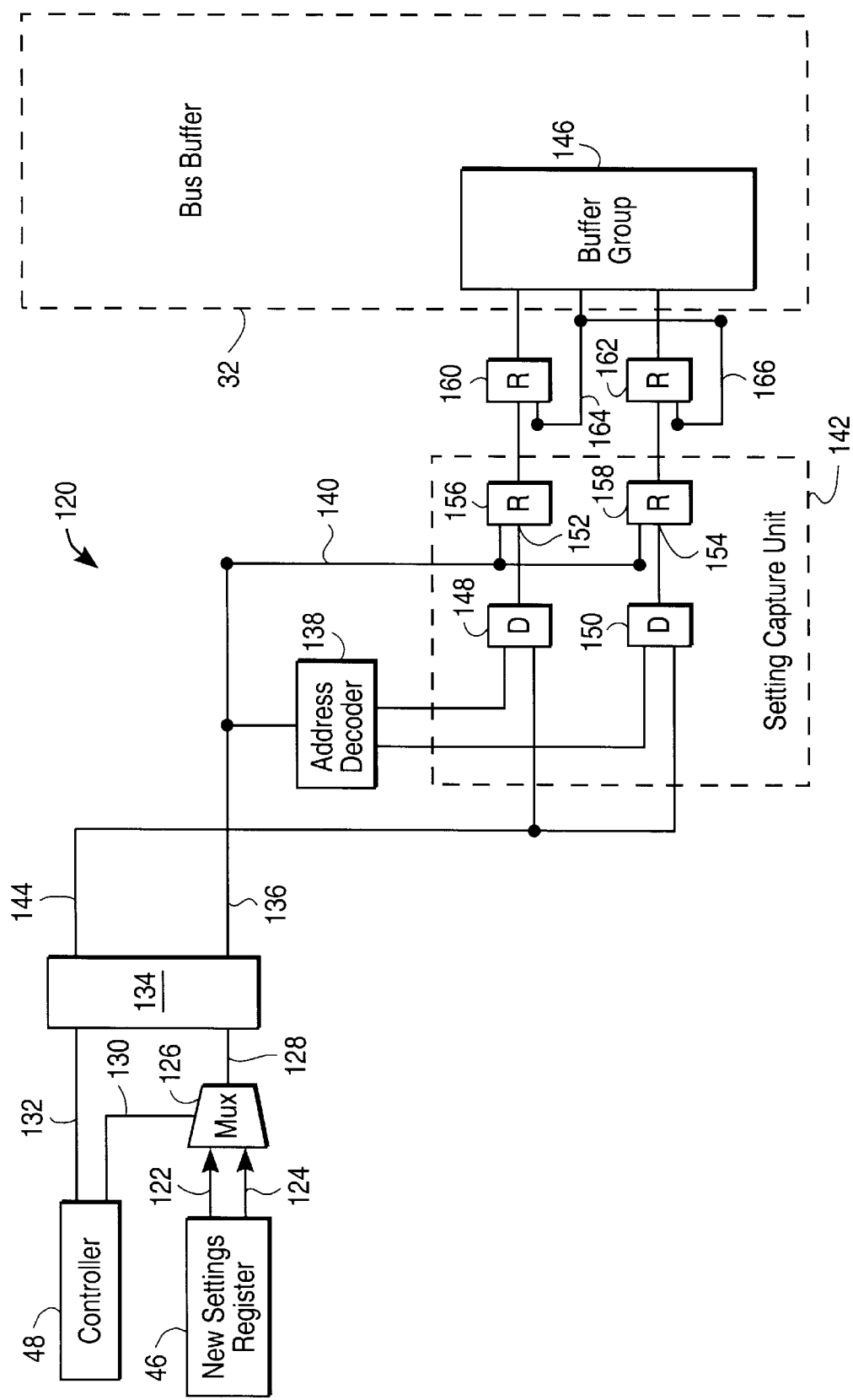
FIG. 5 illustrates a controller of the operational characteristics of bus groups in which the same lines transmit address signals and data signals for the new settings of operational characteristics.

FIG. 5 illustrates a portion of an embodiment for a controller 120 that employs the same lines to transmit the signals for addresses and signals for new settings of the operational characteristics. A new settings register 46 stores both the signals for addresses and signals for the new settings of operational characteristics. The new settings register 46 has first and second output lines 122, 124 for the signals for addresses and signals for new settings of an operational characteristic, respectively. The first and second output lines 122, 124 connect to a bank of 2×1 multiplexers 126 having output lines 128. The controller 48 has one output line 130 for selecting either a signal for addresses or a signal for the new operational characteristic setting as the output signal from the bank of multiplexers 126. The controller 48 has a second output line 132 for transmitting the "address select signal." The lines 128, 132 enter a register 134. Leaving the register 134, the output lines 136 for transmitting both the signals for addresses and the signals for new settings connect, in parallel, to an input terminal of an address decoder 138 and to a data input terminal 140 of a setting capture unit 142. Leaving the register 134, the output line 144 for transmitting the "address select signal" connects, in parallel, to enable inputs of each setting capture unit 142.

For each buffer group 146 of the bus buffer 32, the controller 120 includes one address decoder 138 and one setting capture unit 142. The output signal from the address decoder 138 goes to data input terminals of individual D flip-flops or 148, 150 associated with each operational characteristic that is to be changed, e.g., skew rate and output impedance in FIG. 5. In some embodiments, the flip-flops 148, 150 are replaced with registers that have input terminals that load in parallel, i.e. parallel array of flip-flops or latches. In some embodiments, the D flip-flops 148, 150 are replaced by D latches. The line 144 for transmitting the "address select signal" connects, in parallel, to the enable input terminals of the D flip-flops 148, 150. The output signal from the D flip-flops 148, 150 goes to the enable input terminals 152, 154 of a capture register 156, 158 for the corresponding operational characteristic. The output signals of the capture registers 156, 158 connect to data input terminals of update registers 160, 162 for the buffer group 146. In specific embodiments, the registers 156, 158, 160, parallel loading data input terminals. The registers 156, 158, 160, 166 have a flip-flop or D latch for each bit in the signals for the new settings of operational characteristic. The enable inputs of the update registers 160, 162 are activated by lines 164, 166 when the buffer group 146 is not receiving or sending data to or from the bus lines (not shown) or lines to the device (not shown) that the bus buffer 32 connects to the bus lines (not shown).

Referring to FIG. 5, in specific embodiments, the bus buffer 32 may include several buffer groups 146, each buffer group having a corresponding setting capture unit 142. Then, the setting capture units of other buffer groups are substantially similar, connect to output terminals of the address decoder 138 and connect in parallel with other data capture units 142 to the lines 136, 144. In FIG. 5, the settings of two operational characteristics are controllable with the capture and update registers 156, 158, 160, 162. Specific embodiments may control fewer or more operational characteristics.

Figure 6:
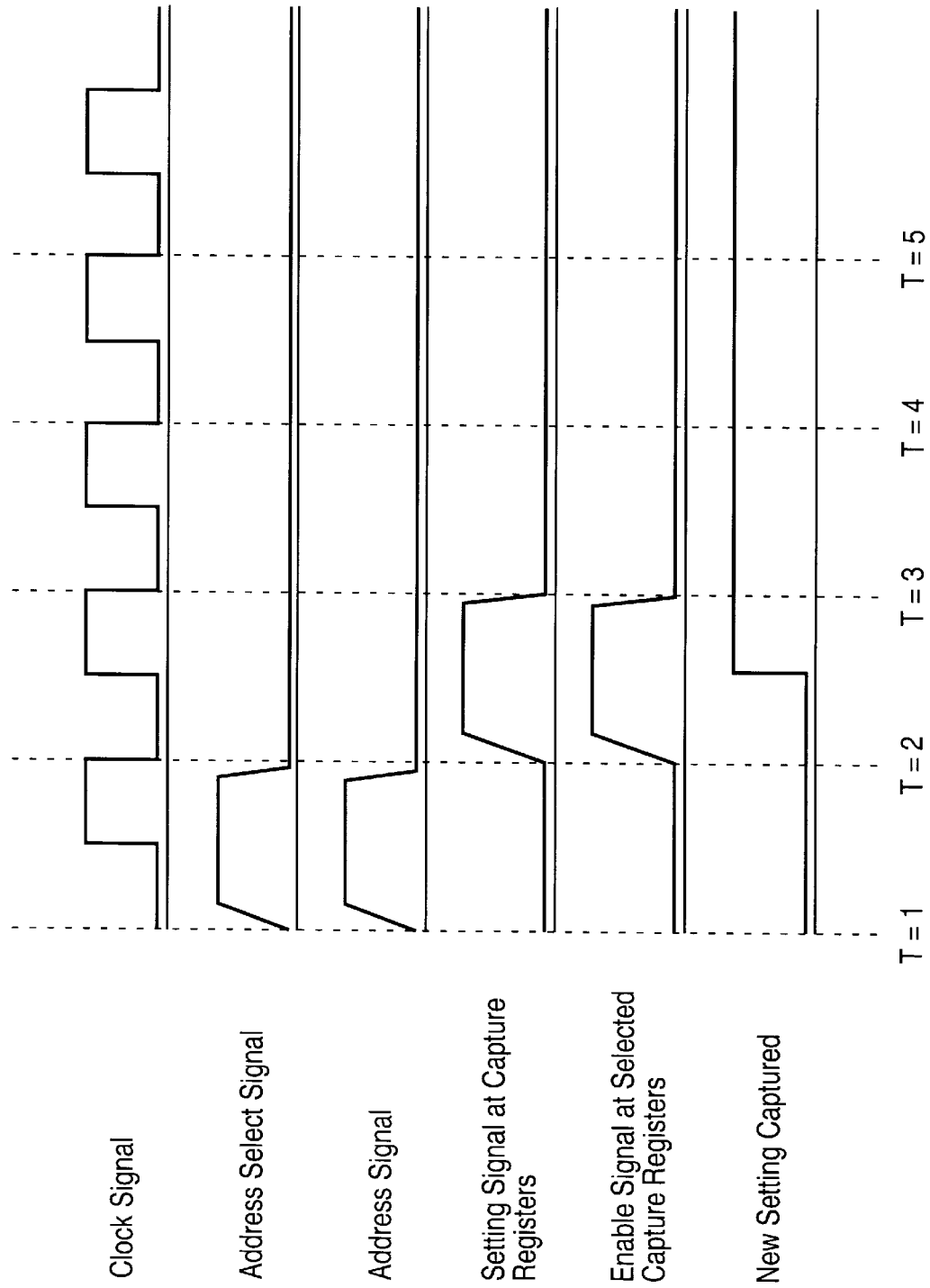
FIG. 6 is a timing diagram for the controller of FIG. 5.

FIG. 6 is a timing diagram for transmitting data, address/type and address select signals using the controller 120 of FIG. 5. At a time T=1, the address/type signal and the address select signal are transmitted on the lines 136 and the lines 144, respectively. The address decoder 138 sends a signal to the data input terminal of one of the D flip-flops 148, 150 if a match occurs with the address received on line 136. The address/type and address select signals activates the flip-flop 148, 150 matching the address/type signal to produce an output signal. At T=2, the output signal from the matching flip-flop 148, 150 arrives at the enable input terminal of corresponding the capture register 156, 158. The enable signal is delayed by one clock cycle with respect to the address/type and address select signals, because the output signals of the D flip-flops 148, 150 follow the input signals by one clock cycle. At T=2, the transmission of the address select signal on the line 144 and the transmission of the address/type signal on the line 136 stop. The transmission of the signal for the new setting of an operational characteristic starts on the line 136 and continues for one clock cycle. The setting signal is received by the data input terminals of the capture registers 156, 158. The setting signals arrive one cycle after the address signals, because the controller 48 selects to send the setting signals are sent for the multiplexer 126 one cycle after the address/type signals. Between T=2 and T=3, the selected capture register 156, 158 is enabled by the output signal from the corresponding flip-flop 148, 150. On the rising edge of the clock signal between T=2 and T=3, the selected capture register 156, 158 latches the signal for the new setting of an operational characteristic. The update registers 160, 162 transmit the signals for the changed settings of the operational characteristics to the buffer group 146 during the next cycle in which the buffer group 146 is inactive. The controller 120 can distribute the new setting of an operational characteristic, of the buffer group 146, in two clock cycles.

3. Device to Change Operational Characteristics of Physically Distributed Buffer In some processors, elements of the data, address, clock groups or other buffer groups of the bus buffer are physically distributed over macroscopic distances. The elements of the buffer groups may be distributed over macroscopic distances to allow for connector pins to attach to the individual lines of the bus. For example, the processor may have an external pin for each line that transmits one bit of address or data information. If elements of the buffer groups are physically distributed at macroscopic distances, signal propagation times can cause the different elements to receive new settings for the operational characteristics during different clock cycles. This may result in undesirable transient operational characteristics in which only a portion of the elements of a buffer group have received new settings for operational characteristics. The problem of transient operational characteristics can be avoided by employing a pipelined structure to send the signals for the address/type or operational characteristic and the signals for the new settings of operational characteristics.

Figure 7:
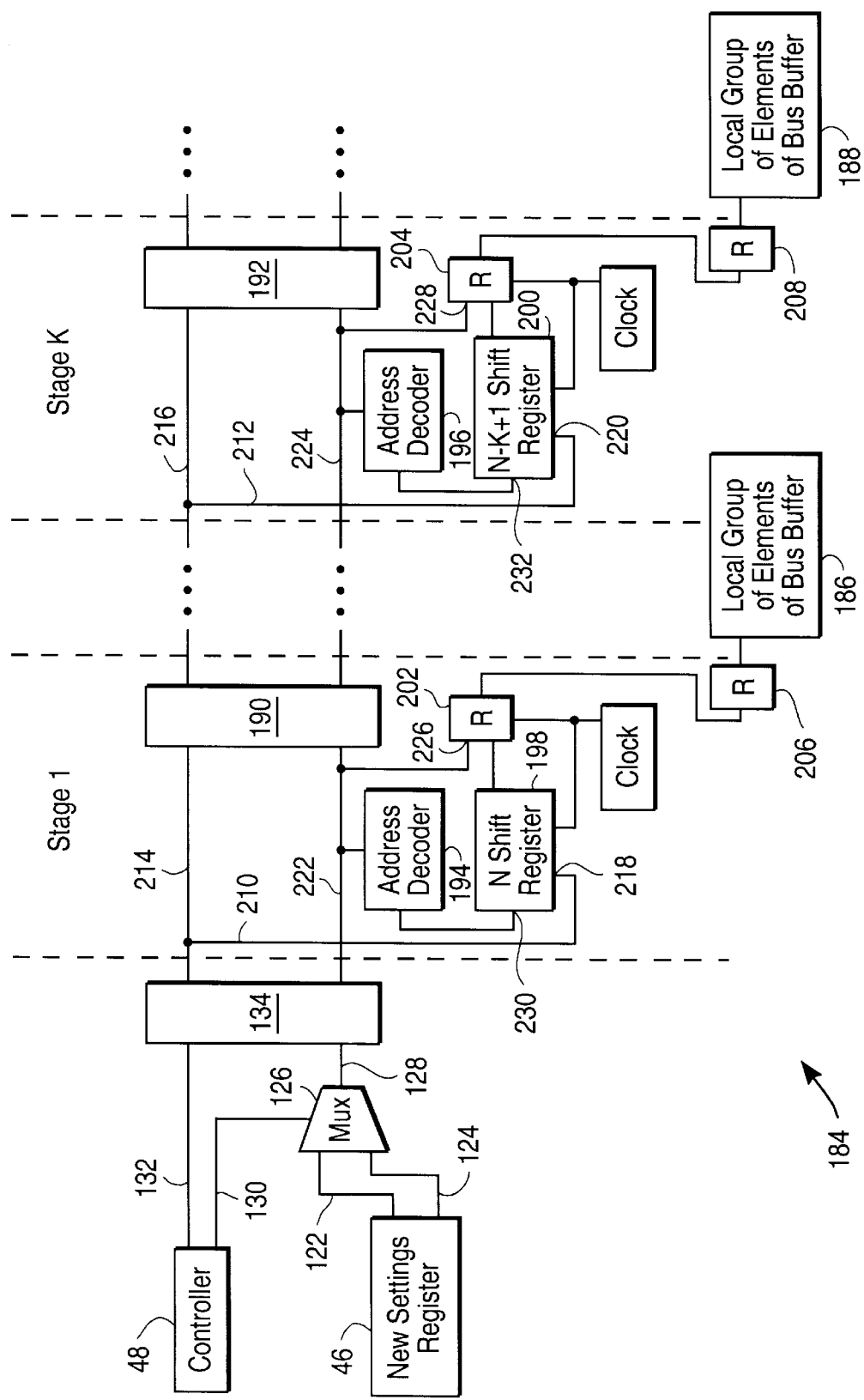
FIG. 7 is a pipelined controller for use in a bus buffer having physically distributed elements.

FIG. 7 shows a portion of an N-stage pipelined controller 184 for changing the settings of an operational characteristic. Each stage of the pipeline delivers signals for address/type and signals for new settings of an operational characteristic to a local group 186, 188 of elements of the bus buffer (not shown). The local groups 186, 188 are physically small enough so that signal propagation times between the portions of the local group are substantially unimportant. For example, a local group 186 may consist of a line for carrying one bit of address or data information. The pipelined controller 184 delivers the new setting of an operational characteristic to all local groups 186, 188 of elements of the bus buffer substantially simultaneously. The controller 120 of FIG. 5 is a one-stage version of the pipelined controller 184.

Each stage of the pipelined controller 184 includes a register 190, 192 for isolating the stage from the next stage of the pipeline, an address decoder 194, 196, a shift register 198, 200, capture registers 202, 204, and update registers 206, 208. For a pipeline having N stages, the shift register 200 of the K-th stage has length (N−K+1) and takes (N−K+1) clock cycles to shift out an input signal. In specific embodiments, the registers 202, 204, 206, 208 are registers having parallel loading data input terminals and made of arrays of flip-flops or D latches. The capture registers 206, 208 transmit the signals for the present settings of an operational characteristic to hardware structures (not shown) internal to the local groups 186, 188 that implement changes to the operational characteristics.

The upper pipeline line 132 is for transmitting the "address select signal" and the lower pipeline lines 128 are for transmitting the signals for the address/type of operational-characteristic and the signals for the new settings of an operational characteristic. In each pipeline stage, a line 210, 212 connects a line 214, 216 for transmitting the "address select signal" to the enable input terminal 218, 220 of the shift register 198, 200 of that stage. Pipeline lines 222, 224 for transmitting the signals for the address and the signals for the new setting of the operational characteristic connect to the input terminals of the address decoders 194, 196 and to the data input terminals 226, 228 of the capture registers 202, 204 of the stage. The address decoders 194, 196 send decoded address signals to the data input terminals 230, 232 of the shift register 198, 200 for the corresponding stage. The shift registers 198, 200 shift output signals to the enable input terminals of the corresponding capture register 202, 204 of the same stage. The shift registers 198, 200 operate to delay the enable signal so that the capture registers 202, 204 of different stages capture the signals for the new setting of an operational characteristic substantially simultaneously.

Figure 8:
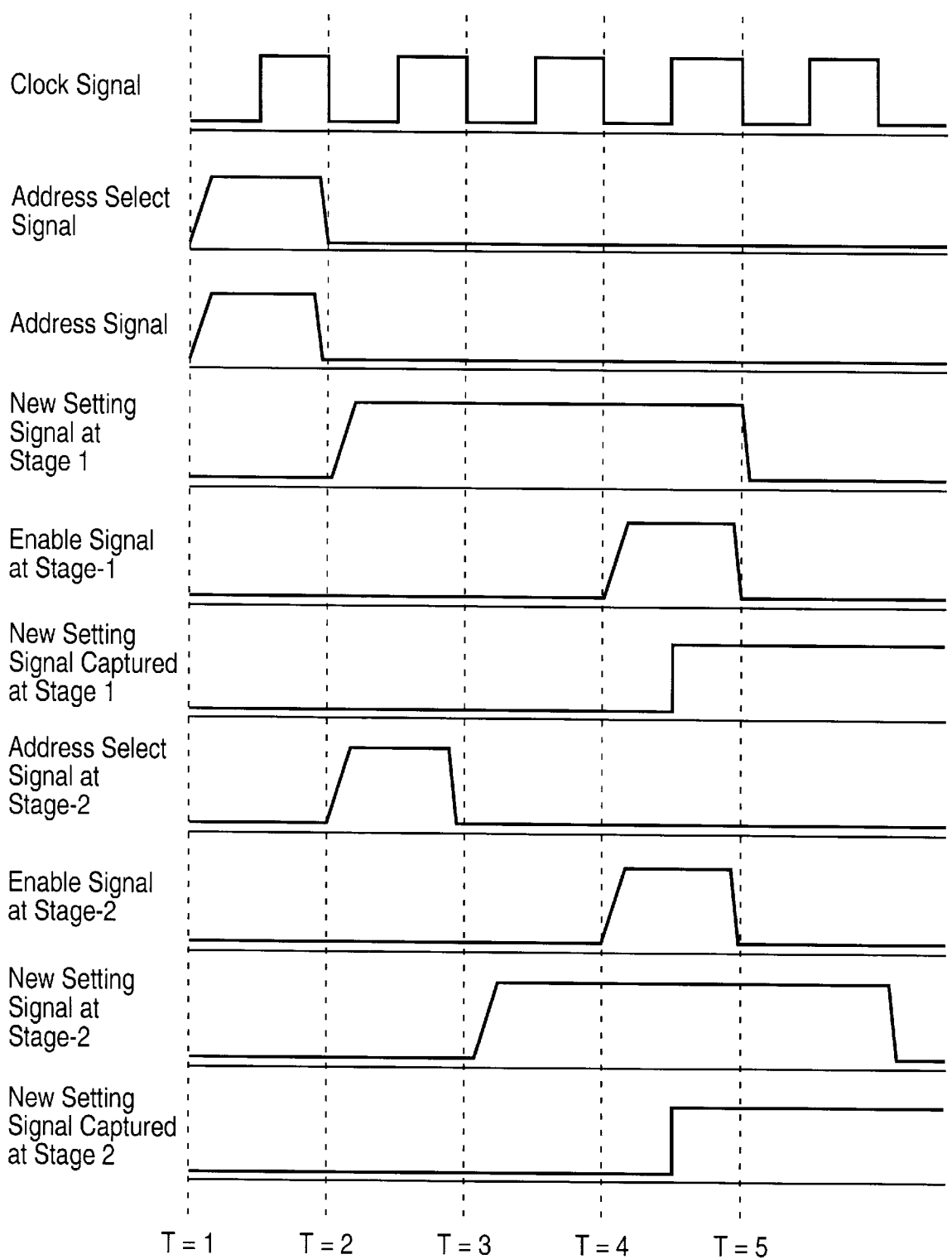
FIG. 8 is a timing diagram for the pipelined controller of FIG. 7.

FIG. 8 is a portion of a timing diagram for a three-stage version of the pipelined device 184 illustrated in FIG. 7. At time T=1, an address signal and an address select signal of value logic 1 are on the lines 222 and the line 214 of the first stage of the pipeline. The address/type and address select signals are one clock cycle in duration. At time T=2, the lines 222 start transmitting a signal for a new setting of a selected operational characteristic. In this example, the signal for a new setting has a duration of about three clock cycles. In other embodiments, the length of the signal for a new setting may be different. The signal on the line 214 has the value logic 0 indicating that the signal transmitted on the lines 222 is for a new settings of an operational characteristic. At time T=2, an address/type signal and an address select signal of value logic 1 are on the lines 224 and the line 216 of the second stage of the pipeline.

At time T=4, the shift register 198 outputs a signal to enable a capture register 202 if the signal for the address, which was received in the first stage between T=1 and T=2, selected one of the capture registers 202. The enable signal has been delayed by three clock cycles with respect to the "address select signal," because the shift register 198 shifts the input address/type signal during three clock cycles before outputting an enable signal, i.e., N=3. The selected capture register 202 of the first-stage capture the new setting of the operational characteristic on the rising edge of the clock pulse between T=4 and T=5.

If one of the capture registers of the K-th stage is selected by the address signal, the shift register 200 outputs an enable signal to one of the capture registers 204 of the K-th stage between T=4 and T=5. The delay for enabling the capture registers 204 of the second stage includes a one cycle delay to pass the address/type and address select signals through the isolating register 190 and a two cycle delay to produce an output signal from the shift register 200 of the second stage, i.e., N−K+1=2 for N=3 and K=2. The registers 204 of the second stage also capture the new setting of the operational characteristic on the rising edge of the clock pulse between T=4 and T=5. The third stage (not shown) of the pipeline also captures the new setting of the operational characteristic at the same time, because the shift register of the third stage (not show) only delays the enable signal by one clock cycle. The pipelined control 184 is constructed to enable the buffer elements connected to each stage to capture the new settings of an operational characteristic substantially simultaneously.

Figure 9:
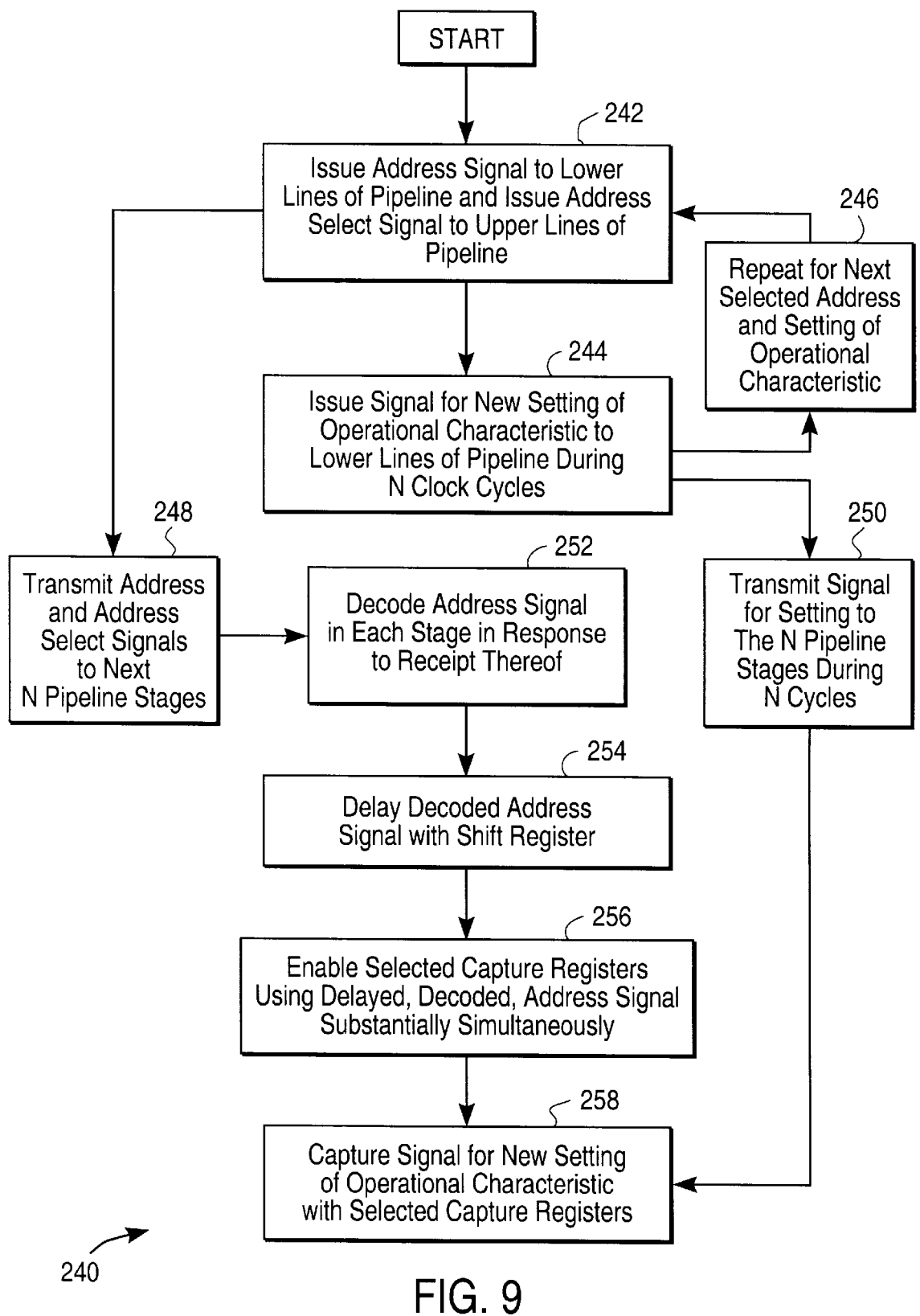
FIG. 9 is a flowchart illustrating the steps of a method for operating the pipelined controller of FIG. 7.

FIG. 9 is a flowchart illustrating a method 240 for using the pipelined controller 184 of FIG. 7 to transmit new settings of an operational characteristic to the local groups 186, 188 of a physically distributed bus buffer. At block 242, an address signal and an address select signal are issued substantially simultaneously to the lower and upper lines 128, 132 of the pipeline, respectively. At block 244, a signal for a new setting of an operational characteristic is issued to the lower lines 128 of the pipeline during N clock cycles for a pipeline having N stages. At block 246, the issue cycles of blocks 242 and 244 for settings and addresses are repeated for the next selected address, i.e. selected operational characteristic and selected buffer group. At block 248, the address signal and address select signal are transmitted to the next N pipeline stages. At block 250, the signal for the new setting of an operational characteristic sequentially transmitted down the pipeline. Each stage transmits the signal, which lasts for N clock cycles, to the next stage. At block 252, each stage of the pipeline decodes the address signal during the clock cycle that the stage receives the address select signal having a value of logic 1. At block 254, the decoded address signal is delayed in a shift register 198, 200 of each stage K during N−K+1 clock cycles. At block 256, the output signal from the shift register 198, 200 of each stage enables selected capture registers 202, 204 in the N-th clock cycle after the address select signal is transmitted to the first stage of the pipeline. At block 258, the selected capture registers 202, 204 connected to stages of the pipelined controller 184 capture signals for the new setting of an operational characteristic substantially simultaneously during the N-th clock cycle after the address select signal is transmitted to the first stage of the pipelined controller 184.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A buffer, comprising:
   at least one buffer group having first and second groups of control input terminals for receiving respective first and second control signals to control different operational characteristics of said buffer group;
   first and second capture registers coupled to accept one of said control signals in parallel bit format, said first capture register accepting the first control signal when enabled and said second capture register accepting the second control signal when enabled;
   first and second update registers each coupled respectively between said capture registers and the control input terminals of said buffer group for receiving the respective control signal from its respective capture register and transferring the control signal to the respective input terminals when its buffer group is idle; and a settings register coupled to said capture registers for programmably generating the control signals.

2. The buffer as set forth in claim 1, wherein said settings register is programmable by one of a software program and a basic input/output system program.

3. The buffer as set forth in claim 1, further comprising a controller coupled to said capture registers for enabling each of said capture registers.

4. The buffer as set forth in claim 3, wherein the buffer group is comprised of an address buffer, a data buffer, or a clock buffer.

5. The buffer as set forth in claim 3, wherein each control signal controls a setting for a skew rate, output impedance, or input impedance of the buffer.

6. The buffer as set forth in claim 1, further comprising third capture and update registers coupled for receiving a third control signal and providing the third control signal to said buffer for controlling a third operational characteristic of the buffer group.

7. A bus buffer, comprising:
   first and second buffer groups;
   first and second capture registers coupled to accept a first control signal and a second control signal respectively in parallel bit format, said first capture register accepting the first control signal when enabled and said second capture register accepting the second control signal when enabled;
   first and second update registers, each coupled respectively to receive the control signal from its respective capture register, for transferring the control signals to respective first and second buffer groups to change an operational characteristic of the respective buffer group when the buffer is idle;
   a settings register coupled to said capture registers for programmably generating the control signals; and
   a controller coupled to said capture registers for enabling each of said capture registers.

8. The bus buffer as set forth in claim 7, wherein said buffer groups comprise one or more of an address buffer, a data buffer, and a clock buffer.

9. The bus buffer as set forth in claim 7, wherein each control signal controls a setting for a skew rate, output impedance, or input impedance.

10. The bus buffer as set forth in claim 7, wherein said capture registers and update registers are parallel registers for storing the control signals.

11. The bus buffer as set forth in claim 7, wherein said settings register is programmable by one of a software program and a basic input/output system program.

12. A pipeline buffer, comprising:
   a plurality of buffer groups for stages of a pipeline;
   a plurality of capture registers, each coupled to accept a particular control signal which is used to change operational characteristic of a buffer group for a respective stage of the pipeline and each accepting its particular control signal when enabled and substantially simultaneous with the other capture registers;
   a plurality of update registers, each coupled respectively to its capture register, for transferring the respective control signal to its respective buffer group for a stage of the pipeline when its respective stage is idle; and
   a settings register coupled to said capture registers for programmably generating the control signals.

13. The pipeline buffer as set forth in claim 12, wherein said settings register is programmable by one of a software program and a basic input/output system program.

14. The pipeline buffer as set forth in claim 12, further comprising a plurality of shift registers respectively coupled to said capture registers for introducing delay in the stages for the enabling of the capture registers.

15. The pipeline buffer as set forth in claim 14, wherein said shift registers have a lengths of delay corresponding to the pipeline stages.

16. The pipeline buffer as set forth in claim 12, further comprising a controller coupled to said capture registers for enabling each of said capture registers.

17. The pipeline buffer as set forth in claim 16, wherein said controller generates enabling signals to enable the capture registers.

18. The pipeline buffer as set forth in claim 12, further an address decoder coupled to the capture registers to decode an address signal from said settings register to determine which capture register is to receive the respective control signal.

19. The pipeline buffer as set forth in claim 18, wherein the operational characteristics are the same operational characteristic but for different stages of the pipeline.

20. The pipeline buffer as set forth in claim 18, wherein the operational characteristic is of a skew rate, output impedance, or input impedance of the stages of the buffer.

21. A bus buffer, comprising:
   at least one buffer group;
   a plurality of capture registers each coupled to receive a particular control signal and coupled to change operational characteristic of the buffer group;
   an address decoder coupled to said capture registers to decode an address signal to determine which capture register is to receive a given control signal; and
   a settings register coupled to said capture registers and address decoder for generating the address signals and the control signals on the same signal in parallel bit format.

22. The bus buffer as set forth in claim 21, further comprising update registers coupled to respective capture registers to transfer the control signals to said buffer group when the buffer group is idle.

23. The bus buffer as set forth in claim 21, wherein said settings register is programmable by one of a software program and a basic input/output system program.

24. A method of changing operational characteristics of a bus buffer, comprising:
   providing a first programmable signal of parallel bits for a first operational characteristic of the buffer at an input of a first capture register;
   enabling the first capture register to latch the first signal, the first capture register being adapted to send the first signal to the buffer group;
   providing a second programmable signal of parallel bits for a second operational characteristic of the buffer at an input of a second capture register;
   enabling the second capture register to latch the second signal, the second capture register being adapted to send the second signal to the buffer group;
   sending the first signal to the buffer group when the buffer group is idle; and
   sending the second signal to the buffer group when the buffer group is idle.

25. The method as set forth in claim 24, wherein the first signal is sent to a first buffer group and the second signal is sent to a second buffer group.

26. The method as set forth in claim 24, wherein the two signals control different operational characteristics for the buffer group.

27. The method as set forth in claim 24, wherein the capture registers provide control signals to different stages of a pipeline, in which one of the signals is sent first but delayed, in order for the two capture registers to capture both signals substantially simultaneously.

28. The method as set forth in claim 24, wherein the control signals and address signals are multiplexed on the same line, the address signals to determine which capture register is to receive a particular control signal.

29. The method as set forth in claim 24 wherein the two signals control same operational characteristics for different buffer groups.

* * * * *